United States Patent [19]

Adamson, Jr.

[11] 4,149,228

[45] Apr. 10, 1979

[54] COMPACT UNIFORM LIGHT DIFFUSER AND ATTENUATOR

[75] Inventor: James R. Adamson, Jr., Alexandria, Va.

[73] Assignee: The United States of America as represented by the Secretary of the Army, Washington, D.C.

[21] Appl. No.: 818,263

[22] Filed: Jul. 22, 1977

[51] Int. Cl.$^2$ .............................................. F21V 7/00
[52] U.S. Cl. .................................. 362/307; 362/310; 362/311; 362/350

[58] Field of Search ................. 362/32, 171, 178, 307, 362/310, 311, 341, 346, 347, 349, 350, 355

[56] References Cited

U.S. PATENT DOCUMENTS 3,848,122  11/1974  Hutchison ............................ 362/355

Primary Examiner—Stephen J. Lechert, Jr.
Attorney, Agent, or Firm—Nathan Edelberg; Milton W. Lee; John E. Halford

[57] ABSTRACT

A compact uniform light diffuser and attenuator is supplied for use with high resolution transparencies and the like, particularly standard resolution patterns.

10 Claims, 2 Drawing Figures

COMPACT UNIFORM LIGHT DIFFUSER AND ATTENUATOR

The invention described herein may be manufactured, used, and licensed by the U.S. Government for governmental purposes without the payment of any royalties thereon.

BACKGROUND OF THE INVENTION

The usual method of providing a uniformly illuminated source of diffuser light is to place a condensing lens between a point light source and a diffusing screen. The condensing lens has to be a certain distance from the diffusing screen and the light bulb to work properly. If the light level at the diffusing screen is to be varied, it is necessary to use neutral density filters, a variable iris or a combination of the two. The resulting structure requires a great deal of space, is difficult to fabricate and is very expensive.

BRIEF DESCRIPTION OF THE INVENTION

An object of the present invention is to provide a light diffuser and attenuator which is light, compact, easy to fabricate, inexpensive, easy to maintain and which can be used to illuminate a standard resolution pattern.

BRIEF DESCRIPTION OF THE DRAWINGS

The invention is best understood with reference to the attached drawings wherein.

DESCRIPTION OF THE INVENTION

Figure 1:
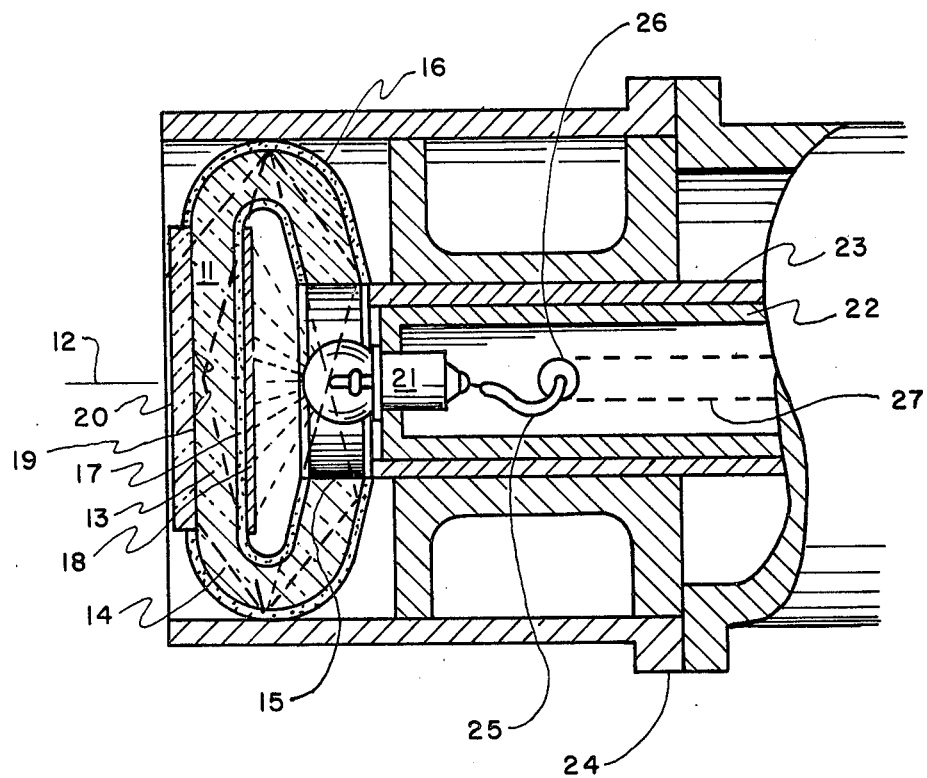
FIG. 1 shows the diffuser according to the present invention in combination with a sliding tube light attenuator.

Referring specifically to FIG. 1, the diffuser is seen to comprise basically a cup shaped member 11 of light conducting plastic, e.g., Lucite, having a generally C-shaped cross-section. The cross-section is symmetrical about its axis 12. The image wall 13 of member 11 which is centered on the axis and extends in a flat circular configuration almost to the most remote dimension of the diffuser from the axis. The collector wall 14 is a toroidal continuation of the image wall and curves sharply away from the plane of the image wall until it approaches the axis of the diffuser at an angle of about 85°. It terminates in a cylindrical input face 15 at a normal distance from the axis of about ⅜ inches its maximum distance from the axis being about 1⅛ inches to form a conelike toroidal structure. Both walls are composed of a light conducting material such as Lucite and are preferably constructed in one place. The wall thickness is approximately ⅛ inches. The outer surface of the collector wall is covered with a light reflecting coating 16 such as a white gloss paint. The inner surface is covered by a similar coating 17 on both the collector and the image walls. The generally cylindrical input surface 15 of the collector wall is not coated, but is polished to improve light transmission. A transparent non-reflective coating (e.g., λ4) can be used on this surface, if greater efficiency is required. The inner surface of the image wall is additionally covered with a black felt 18 or similar material to block direct transmission of light into the wall through this surface. The outer surface 19 of this same wall is provided with a fine grain either by removing or etching transparent material therefrom. One method calling "hydrohoning" involves passing a liquid such as water containing #600 abrasive grit over the plastic surface. The grain must, of course, be much finer than the resolution of the pattern on the transparency 20 to be reviewed. The transparency 20 is mounted on the external face 19 of the image wall.

The light source 21 is a low power bulb (2 volt - 0.06 amp) which is mounted on the end of a sliding hollow tube 22. This tube slides in a stationary close fitting outer tube 23 supported in fixed relationship to diffuser 11 by housing surfaces 24 (shown in outline only). Tube 23 is coaxial with the diffuser and terminates adjacent the nearest edge of input face 15 and the two are about the same diameter. As the tube 22 is drawn into tube 23 the light entering the surface 15 is attenuated from a maximum which occurs with the bulb centered opposite that surface. The lead 24 (or leads if the housing is not used as a return conductor) may pass through a hollow anti-rotation stop pin 26 set in the wall of tube 22. This pin rides in a lead slot 27 in the outer tube 23. The lead circles the tube several times and threads through housing elements to batteries located in the housing. Slot 27 extends nearly to the ends of the tube 23 to maintain a small percentage of overlap.

Figure 2:
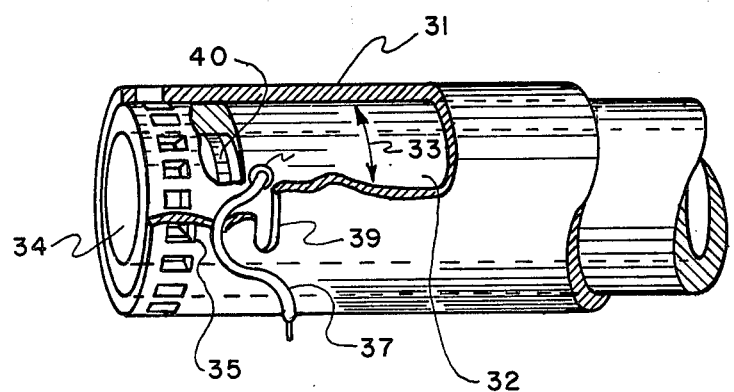
FIG. 2 shows the same diffuser as in FIG. 1 in combination with a sliding and/or rotating tube attenuator.

FIG. 2 shows a different arrangement of the elements in FIG. 1 to provide an attenuator that varies the light source from zero to maximum. Instead of the bulb projecting out the end of tube 32, it is located inside it. In this embodiment the moveable tube does not slide but rotates. To support the bulb and facilitate electrical connections, one terminal of the bulb may be electrically attached to the inner tube 33, a washer shaped bulb support 40 and metal housing 24 forming a ground return. The bulb remains centered opposite the face 15. If desired, the end of tube 32 may be closed with an opaque end piece 34. The two tubes are provided with mating equal slots 33 separated by equal spacings. A large number of slots are used to spread the light more evenly around the circumference of the input face 15 and are slanted for the same purpose. A hollow pin 38 in the rotating tube and a slot 39 in the stationary tube or vice-versa permits leads 37 to enter the tube to support (in lieu of washer 34) and/or supply the bulb. It is preferred that the inner tube 32 rotate, but if it is pinned to the housng through a slot like slot 39, the outer tube can be the rotating member.

The details of the transparency pattern 20 are given in Table 1. With such a pattern the diffuser makes an ideal structure for the target of the image intensifier test device disclosed in copending Patent Application Ser. No. 818,264 (EPA 1691) filed on even date herewith; wherein a more detailed disclosure of housing elements, like elements 24 in FIG. 1, can be seen.

Many variations of the structures disclosed herein will be immediately obvious to those skilled in the art, but the invention is to be limited only as defined in the claims which follow.

TABLE 1

USAF RESOLUTION CHART DATA
USAF 1951
Part No. 040970-482

The need to assign numerical dimensions and tollerances to the

TABLE 1-continued
USAF RESOLUTION CHART DATA
USAF 1951
Part No. 040970-482 performance of optical systems and photographic processes has resulted in the general acceptance of the USAF 1951 resolving power test target. The basic pattern dimensions employed in the test target are defined in MIL 150-A, paragraph 5.1.1.7.

The standard USAF 1951 target consists of a series of patterns decreasing in size in a geometric progression as the sixth root of 2. The number of lines per millimeter doubles with every sixth target element. The width-of-line/width-of-space ratio is a nominal 1:1 and the line length to line width ratio is 5:1.

Resolution targets are available in negative form (clear bars and opaque background) and positive form (opaque bars and clear background).

The target contrast is normally specified as either high, medium, or low with contrast defined as the density difference between the line and the background.

INTERVAL . a line or a space
UNIT . a line and the adjacent space
PATTERN . three lines and two included spaces
ELEMENT . consists of two patterns at right angles to each other, and separated by one unit width

RESOLUTION RANGE BY GROUP AND ELEMENT

| ELEMENTS | Groups | | | | | | | | | |
|---|---|---|---|---|---|---|---|---|---|---|
| | −2 | −1 | 0 | 1 | 2 | 3 | 4 | 5 | 6 | 7 |
| 1 | 0.250 | 0.500 | 1.00 | 2.00 | 4.00 | 8.00 | 16.0 | 32.0 | 64.0 | 128 |
| 2 | 0.281 | 0.561 | 1.12 | 2.24 | 4.49 | 8.98 | 17.9 | 35.9 | 71.8 | 143 |
| 3 | 0.315 | 0.629 | 1.26 | 2.52 | 5.04 | 10.1 | 20.1 | 40.3 | 80.6 | 161 |
| 4 | 0.354 | 0.707 | 1.41 | 2.83 | 5.66 | 11.3 | 22.6 | 45.3 | 90.5 | 181 |
| 5 | 0.397 | 0.794 | 1.59 | 3.17 | 6.35 | 12.7 | 25.4 | 50.8 | 101 | 203 |
| 6 | 0.445 | 0.891 | 1.78 | 3.56 | 7.13 | 14.3 | 28.5 | 57.0 | 114 | 228 |

I claim:

1. A compact light diffuser comprising:
a cup shaped toroidal member of C-shaped axial cross-section, made from light conducting plastic, having an axis of revolution, a flat circular image wall centered normal to said axis and a smoothly curved collector wall extending said image wall and terminating in a right circularly cylindrical input face coaxial with said axis;
a coating of glossy white paint covering the inner surface said member to the edge of said input face and the outer surface of said collector wall; and
the outer surface of said image wall having a light scattering translucent surface.

2. A diffuser according to claim 1 wherein:
said walls have a uniform thickness.

3. A diffuser according to claim 1 wherein:
a layer of opaque light absorbing material covers the portion of said coating on said image wall.

4. A diffuser according to claim 1 wherein:
a light source is mounted on said axis adjacent said input face and interconnected with said cup-shaped member of means of housing members.

5. A diffuser according to claim 4 wherein said housing members include:
a pair of generally equal length close fitting overlapping tubes coaxial with said axis;
a first support means to rigidly interconnect a first of said tubes with respect to said diffuser; and
a second support means to locate said light source a fixed distance from the end of the second of said tubes.

6. A diffuser according to claim 5 wherein:
said second tube is slideable within said first tube;
said first tube has approximately the same diameter as said input face and and abuts thereto; and
said light source is located at the approximate center of the space defined by said input face, when said tubes are fully overlapped.

7. A diffuser according to claim 5 wherein:
said second tube fully overlaps said first tube and is rotatable relative thereto,
the illuminated end of each tube overlaps said input face, each said illuminated end contains a plurality of equal shutter slots with equal spacing extending around the entire circumference thereof; and
said light source is located at the center of the space with said input face.

8. A diffuser according to claim 6 wherein:
one of said tubes contains an aperture for a lead to said source;
stop means interconnect said tubes to prevent relative rotation and limit the relative axial positions of the tubes to maintain at least a small percentage of overlap; and
the remaining tube contains an axial lead slot which continuously overlaps said aperture at all relative overlapping positions of the tubes.

9. The diffuser according to claim 7 wherein:
one of said tubes contains a lead aperture for the lead from said light source;
stop means are provided to prevent relative axial movements and to limit the relative rotation between the tubes to the angle defined by the circumferential arc subtending one shutter slot; and
the remaining tube contains a circumferential slot having which overlaps the lead aperture at all angular positions of the tubes.

10. The diffuser according to claim 1 wherein:
a standard resolution trasparency is attached to said image wall on said outer surface.

* * * * *